No. 636,956. Patented Nov. 14, 1899.
F. G. CURTIS.
PROCESS OF MAKING BATTERY CUPS.
(Application filed May 10, 1897. Renewed Apr. 20, 1899.)
(No Model.)
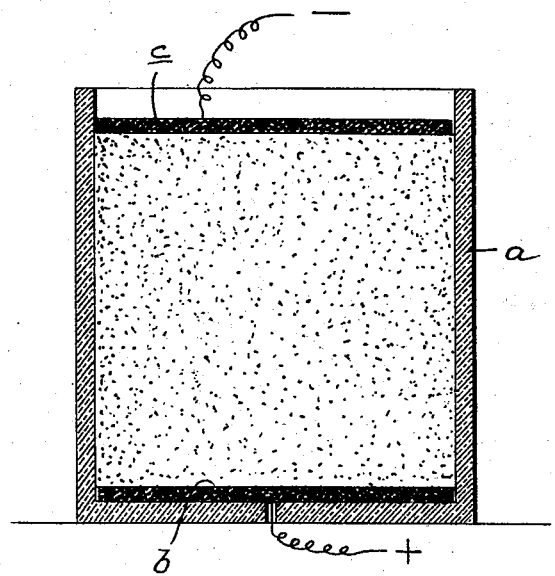
Witnesses:
Inventor.
Frank G. Curtis
By James Pheeby
Attorney

UNITED STATES PATENT OFFICE.

FRANK GEORGE CURTIS, OF EVERETT, MASSACHUSETTS, ASSIGNOR TO THE AUTOMATIC ELECTRIC PUMP COMPANY, OF BOSTON, MASSACHUSETTS.

PROCESS OF MAKING BATTERY-CUPS.

SPECIFICATION forming part of Letters Patent No. 636,956, dated November 14, 1899.

Application filed May 10, 1897. Renewed April 20, 1899. Serial No. 713,755. (No specimens.)

*To all whom it may concern:*

Be it known that I, FRANK GEORGE CURTIS, a citizen of the United States, residing at Everett, in the county of Middlesex and State of Massachusetts, have invented certain new and useful Improvements in Processes of Making Battery-Cups; and I do declare the following to be a full, clear, and exact description of the invention, such as will enable others skilled in the art to which it appertains to make and use the same.

My invention relates to a process for making those porous earthenware cups which are used in electrogalvanic batteries, and it will be fully understood from the following description and claims when taken in conjunction with the annexed drawing, in which the figure is a sectional view of an apparatus used in carrying out a portion of my process.

In making a porous cup in accordance with my improved process I first take about one hundred pounds of clay and wash the same with water. I then make a solution consisting of five gallons of water and one pound of hydrate of potassium and mix the same thoroughly with the clay. The hydrate of potassium serves to dissolve the excess of sulfates when the same are present in the clay. This being done the clay is placed in the receptacle $a$, (shown in the drawing,) a carbon plate $b$, connected with the plus pole of an electric generator, (not illustrated,) being arranged at one end of the mass of clay and a carbon plate $c$, connected with the minus pole of the generator, being arranged at the opposite end thereof. An electric current of about twenty volts and fifty amperes is now passed through the clay for about five hours, the clay being stirred or mixed at intervals of about thirty minutes to permit the gases to escape therefrom. This electric current will reduce the clay from a granular state to a powder paste by reason of the hydrogen being set free. I am unable to state, however, what chemical or electrochemical reactions occur. After being subjected to the action of the electric current the clay is again washed with water and is then ready to be molded into cups. These cups are baked for about one week.

Cups made by the process described in the foregoing are advantageous for use in electrogalvanic batteries because they have a much lower internal resistance than the ordinary porous cups, and consequently permit the current generated to discharge at a high amperage and electromotive force.

Having thus described my invention, what I claim is—

1. The process described for preparing clay prior to forming it into porous cups for use in electrogalvanic batteries, consisting in mixing the clay with a solution of water and hydrate of potassium and afterward passing an electrical current through the mixture, substantially as specified.

2. The process described of making porous earthenware cups, consisting in mixing clay with a solution of water and hydrate of potassium, then passing an electrical current through the mixture and finally molding the mixture into cups and baking the same, substantially as specified.

In testimony whereof I affix my signature in presence of two witnesses.

FRANK GEORGE CURTIS.

Witnesses:
GEORGE F. ATWOOD,
ELMAR A. MESSINGER.